3,475,354
POLYEFIN FOAM
Donald G. Needham, Ramona, and Denney M. Kier, Bartlesville, Okla., assignors to Phillips Petroleum Company, a corporation of Delaware
No Drawing. Filed Nov. 13, 1964, Ser. No. 411,107
Int. Cl. C08f 47/10, 29/04
U.S. Cl. 260—2.5                7 Claims

ABSTRACT OF THE DISCLOSURE

A foamed polymeric material having uniform cellular structure is made by dry blending a polyolefin resin with a blowing agent and 5 to 15 weight percent water, based upon the weight of the polyolefin, forming the blend into a desired shape without melting the polyolefin, and heating the shaped blend with the water present to a temperature sufficient to decompose the blowing agent and form a foam.

---

This invention relates to a method of producing polyolefin foam.

Foams have been produced of a number of polyolefin resins. The essential ingredients for such a product include the resin and a blowing agent, such as azodicarbonamide. Other materials which have been added include activators such as zinc oxide, and a heat sink, such as the lower alcohols. A heat sink is an inert material which will evaporate during the cooling of the blown resin having sufficiently high latent heat of vaporization to absorb at least a portion of the thermal energy released during the solidification of the resin. Sometimes a cross-linking agent is included in the composition.

In previous operation the desired ingredients have been blended by melting the polymer in a closed system such as a Banbury mixer, an extruder, a pressure kettle, etc. Foaming takes place when the mixture is released from the closed system. Frequently, preliminary mixing in an open vessel was carried out but this was always followed by the closed system. Such a closed system adds considerably to the overall cost of operation.

An object of this invention is to provide a new method of producing polyolefin foam. A further object is to provide a foam production process which eliminates closed system mixing apparatus. A further object is to provide a process of producing polyethylene foam.

Broadly, the invention resides in a process which comprises dry blending in an open container polyolefin resin with a solid blowing agent and water, forming the mixture to a desired shape without melting the resin, and heating the shaped material to form a foam, said foam being characterized by a uniform cell structure.

We use the phrase "dry blending" to distinguish from resin melting processes used in the prior art. Obviously, with water present, the mixture is not completely dry. The optimum concentration of water is about 10 percent based on the weight of resin used although the range of 5 to 15 percent gives good results. The water absorbs the latent heat of crystallization functioning as a heat sink.

Use of water as a heat sink runs contrary to certain suggestions in the prior art to the effect that the heat sink should be a material that is compatible with the resin. Other workers in the art have suggested addition of liquids other than water to improve dispersion of additives in the resin. Our work has shown water is necessary during the blowing step. If the water is evaporated off of a composition which otherwise produces a good foam of our invention, poor foam results. It is not distinguishable from the same foam in which no water was used.

The invention is applicable to the various polyolefin resins now available. These include high and low density polyethylenes, polypropylenes, polymers of the higher olefins, copolymers of two or more olefins such as ethylene/propylene copolymers, ethylene/1-butene copolymers, ethylene/propylene/dicyclopentadiene rubbers, etc.

The blowing agents employed, which preferably decompose with the liberation of gaseous material at a temperature of 300 to 700° F. are known to those skilled in the art. Specific examples are azodicarbonamide, 4,4'-oxybis(benzenesulfonyl hydrazide), dinitrosopentamethylenetetramine, diazoaminobenzene, etc. Based on the weight of the resin, 1 to 15 percent of blowing agent is generally used.

As is also known in the art, promoters or retarders can be incorporated in the mixture. Such additives decrease or increase, respectively, the temperature at which the blowing agent decomposes. Specific examples of these materials include zinc oxide, lead acetate, zinc laurate, cadmium amyl phosphite, etc. The producers of blowing agents supply lists of suitable temperature control additives. The amount is generally 0.25 to 5 parts per part of blowing agent.

The foam of this invention has a number of important uses in industry. Some uses include electrical insulation, waterproofing material, padding and shock absorbers, rug backing, heat insulation, etc. In the shock absorber field large amounts of foam coated paper are used for wrapping fragile parts for shipping. For this use an especially tough foam is required and polyethylene foam coated paper has been used for this purpose. For this operation the particulate coating composition is merely doctored onto the paper followed by heating.

Since no melting is involved in preparing the mixture to be formed, best results are obtained when the resin has a comparatively small particle size. Based on the U.S. sieve series, the resin powder should pass through Sieve No. 30 and preferably through Sieve No. 50. It can be more finely divided.

The blending time is not critical. It must be sufficient to get a good dispersion of additives used. A time of 5 to 30 minutes is generally satisfactory with 10 minutes used in most of our work.

The following example sets forth a specific embodiment of our invention. It should not be considered unduly limiting.

Example

Polyethylene particles which passed through a Sieve No. 50 having a density of 0.914 (ASTM D1505–57T) were mixed in a tumbler at room temperature for 10 minutes using the following recipe

|  | Parts by wt. |
|---|---|
| Polyethylene | 100 |
| Azodicarbonamide | 5 |
| Zinc oxide | 5 |
| Water | 10 |

This mixture was coated on kraft paper and foamed by heating in a forced draft oven at 350° for 10 minutes. Good foam of uniform cell structure resulted.

When the above run was repeated, omitting the water, poor foam resulted. The same result was obtained when the water was evaporated prior to the heating step.

As many possible embodiments can be made of this invention without departing from the scope thereof, it is to be understood that all matter herein set forth is to be interpreted as illustrative and not as unduly limiting the invention.

We claim:
1. A process comprising dry blending a polyolefin resin in an open container with a solid blowing agent in the amount of 1 to 15 weight percent, based upon the weight of said polyolefin, and water in the amount of 5 to 15 weight percent, based upon the weight of said polyolefin; forming the resulting blend into a desired shape at a temperature below the melting point of said polyolefin; and heating the shaped blend while the water is still present to a temperature sufficient to decompose said blowing agent and form a foamed material; said foamed material being characterized by a uniform cellular structure.

2. The process according to claim 1 wherein said polyolefin is polyethylene.

3. The process according to claim 1 wherein said polyolefin is polypropylene.

4. The process of claim 1 wherein said polyolefin is in particle form having a size no greater than that which will pass through a U.S. sieve No. 30.

5. The process according to claim 1 further comprising blending a temperature control additive in the amount of 0.25 to 5 parts per part of said blowing agent with said polyolefin, said blowing agent and said water.

6. A process comprising dry blending particulate polyethylene or polypropylene having a size no bigger than that which will pass through a U.S. sieve No. 30 with a solid blowing agent in the amount of 1 to 15 weight percent, based upon the weight of the polyethylene or polypropylene; a temperature control additive in the amount of 0.25 to 5 parts per part of said blowing agent, and water in the amount of 5 to 15 weight percent, based upon the weight of the polyethylene or polypropylene; forming the resulting blend into a desired shape at a temperature below the melting point of said polyethylene or polypropylene; and heating the shaped blend while the water is still present to a temperature sufficient to decompose said blowing agent and form a foamed material, said foamed material being characterized by a uniform cellular structure.

7. A process comprising dry blending polyethylene having a particle size capable of passing a U.S. sieve No. 50 with 5 parts of azodicarbonamide, 5 parts of zinc oxide, and 10 parts of water, all based on 100 parts by weight of said polyethylene; spreading the mixture onto a paper support at a temperature below the melting point of said polyethylene; and heating the paper and the mixture, while the water is still present, for about 10 minutes at 350° F. to decompose the azodicarbonamide and form a foamed polyethylene, said polyethylene foam being characterized by uniform cellular structure.

References Cited

UNITED STATES PATENTS

| | | | |
|---|---|---|---|
| 2,804,435 | 8/1957 | Reed | 260—2.5 |
| 3,072,972 | 1/1963 | Yokose et al. | 260—2.5 |

FOREIGN PATENTS

| | | |
|---|---|---|
| 521,294 | 1/1956 | Canada. |

MURRAY TILLMAN, Primary Examiner

W. J. BRIGGS, SR., Assistant Examiner

U.S. Cl. X.R.

264—51, 54